(No Model.)
G. L. ARTZ.
TOP PROP BLOCK FOR CARRIAGES.
No. 313,570. Patented Mar. 10, 1885.
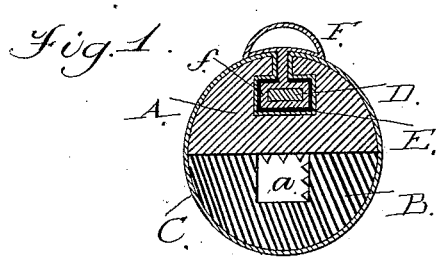
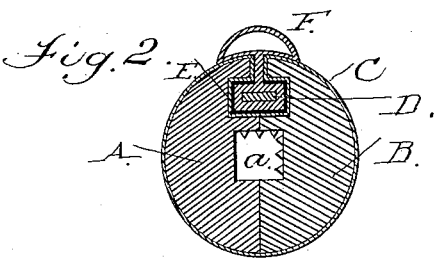
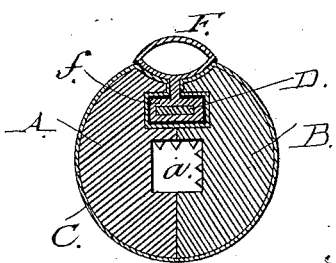
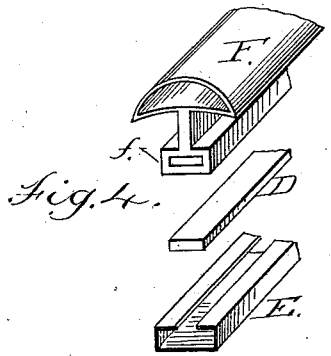
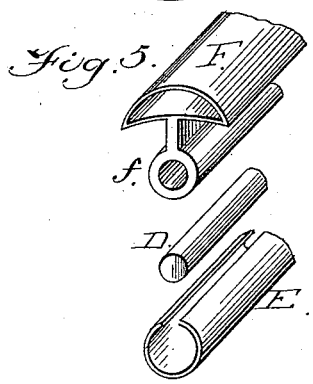
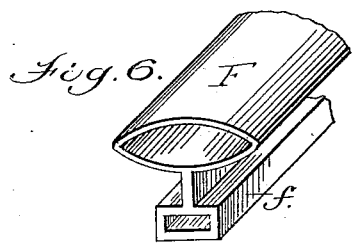
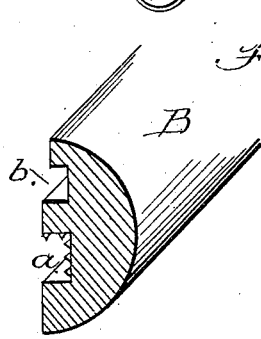
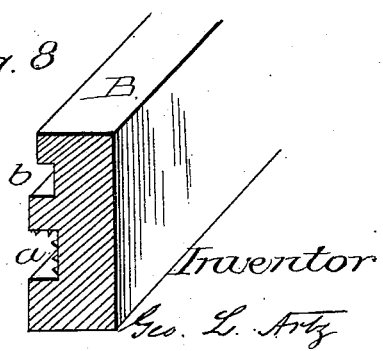
Witnesses:
T. Walter Fowler,
De Witt C. Allen.
Inventor
Geo. L. Artz
per atty.
A. H. Evans & Co

United States Patent Office.

GEORGE L. ARTZ, OF COLUMBUS, OHIO.

TOP-PROP BLOCK FOR CARRIAGES.

SPECIFICATION forming part of Letters Patent No. 313,570, dated March 10, 1885.

Application filed September 12, 1883. Renewed June 23, 1884. (No model.)

*To all whom it may concern:*

Be it known that I, GEORGE L. ARTZ, a citizen of the United States, residing at Columbus, in the county of Franklin and State of Ohio, have invented certain new and useful Improvements in Top-Prop Blocks for Carriages; and I do hereby declare the following to be a full, clear, and exact description of the same, reference being had to the accompanying drawings, forming a part of this specification, in which—

Figures 1, 2, and 3 represent transverse sectional views of a complete block, showing my improvements applied thereto.; Figs. 4, 5, 6, 7, and 8, detached views to be hereinafter referred to.

This invention relates to certain new and useful improvements in top-prop blocks usually applied to prop-irons in the construction of carriages, and more particularly to improvements upon my former patent dated August 21, 1883, and numbered 283,553.

The object of the present invention is the production of a more perfect prop-block having a separate and independent cushion or molding for the top-bows of carriages to rest upon that will be more durable and more easily and cheaply manufactured; and to this end the invention consists in novel features of construction and combination of parts, all as will be hereinafter fully described, and set forth in the claims hereto annexed.

In the drawings, A and B represent the two longitudinal sections composing the block, which may be formed in two horizontal or vertical longitudinal sections, as shown in Figs. 1, 2, 3. I prefer, however, to make them as shown in Figs. 2 and 3, and detail, Figs. 7 and 8, in which case the grooves $a$ and $b$ for the reception of the prop-iron and the T-head of the cushion or molding will be formed partially in each section, the groove $a$ for the reception of the prop-iron being lined with an elastic surface, and the sections glued together in a similar manner as in my former patent above referred to.

C represents a thin sheath or covering of rubber or other suitable material made large enough, so that when pressed down into the groove $b$ it will close to or tight around the block. To keep this sheath or covering C down in the groove $b$, and closely fitting the walls thereof when the head of the cushion or molding is not drawn therein, I provide a thin tubular piece, E, made of textile or other suitable material and stiffened with shellac, and formed so as to press and hold the sheath or covering hard and firm against the walls or sides of the groove $b$. The T-head $f$ of the cushion or molding F may then be drawn through the groove $b$ and piece E at any time, and will be outside of and on top of the sheath or covering. The T-head and top portion of the cushion or molding is made hollow or constructed with a recess running entirely through them longitudinally, and when the head $f$ has been drawn into the block I drive through the hollow or recessed head $f$ the pin or small piece of wood D, made of the proper size and form to fit the hole or recess. This tightens the head in the groove of the block and renders it impossible of removing without drawing it out lengthwise, besides rendering the block perfectly solid. It will be seen that the block being made in half-sections the groove for the T-head of the cushion or molding will or may be formed at the same time the groove or recess for the prop-iron is formed, and it may be made slightly tapering toward the T-head, so that the cushion or molding will sink down into the block, as shown in Fig. 3, which is preferred, as a broader bearing is furnished for the cushion to rest upon the block and more equally distributing the weight thereon. The sections of the block may be made square or rectangular in cross-section, and the T-head of the cushion made round, oval, or square in cross-section, as may be deemed expedient, the groove $b$ and tubular piece E being made to always conform to the shape of the T-head.

By the above described construction of prop-block and cushion or molding, the latter, if it should at any time wear, can be easily and readily replaced by a new one. The rubber cushion or molding being the most expensive material used in the manufacture of prop-blocks, by the present construction there is a great saving in said material.

Prop-blocks as heretofore constructed with an elastic removable cushion drawn through a T-groove in the blocks, have also been found objectionable for the reason that the portion which is drawn through the groove in the block is very easily pulled out by taking hold of the cushion and lifting it up, and even when the block is properly attached or connected with the prop-iron it is liable to be knocked out and lost at any time.

By my present construction of the removable cushion or molding and the manner of securing it to the block it is impossible to move it without drawing it out longitudinally, so that no loss of cushion or molding can possibly occur.

Having thus fully described my invention, what I claim as new, and desire to secure by Letters Patent, is—

1. The combination, with the grooved prop-block and sheath or covering C, of the tubular piece E, substantially as and for the purpose specified.

2. The combination, with the grooved prop-block, of the recessed independent elastic removable cushion or molding F and the pin or plug D, substantially as and for the purpose specified.

3. The combination, with the grooved prop-block and sheath or covering C, of the recessed independent elastic removable cushion F and pin or plug D, substantially as and for the purpose specified.

4. The combination of the grooved prop-block, sheath or covering C, tubular piece E, recessed independent elastic removable cushion or molding F, and the pin D, substantially as and for the purpose specified.

5. The prop-block composed of the longitudinal vertical sections A B, having the prop-iron groove $a$, and groove or recess $b$, in combination with the cushion or molding F, substantially as and for the purpose herein shown and described.

GEORGE L. ARTZ.

Witnesses:
J. W. MOONEY,
GEO. GLASS.